United States Patent Office 3,538,152
Patented Nov. 3, 1970

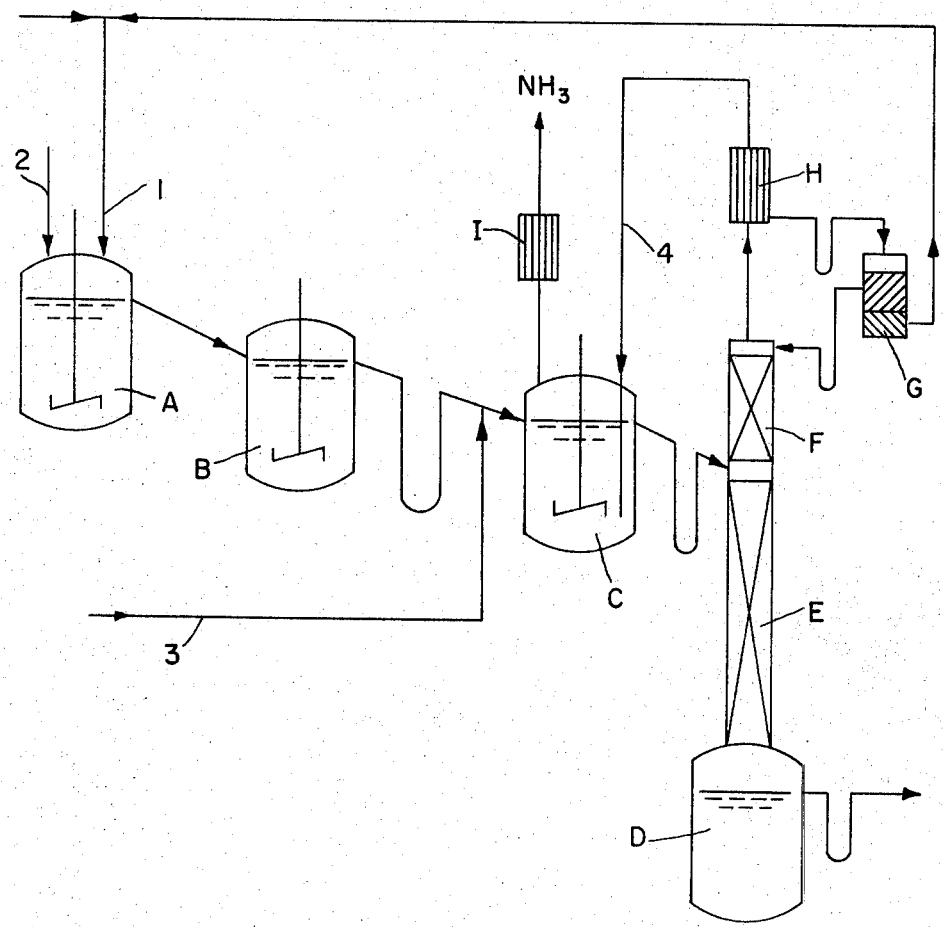

3,538,152
PRODUCTION OF ALKALI METAL SALTS OF PHENYLGLYCINE
Hubert Kindler, 19 Westring, Ludwigshafen (Rhine), Germany; Waldemar Koehler, 3 am Bahnhof, Boehl, Pfalz, Germany; and Erich Tolksdorf, 12 Blieskasteler Strasse, Ludwigshafen (Rhine), Germany
Filed Mar. 24, 1967, Ser. No. 625,834
Claims priority, application Germany, Apr. 2, 1966, 1,543,342
Int. Cl. C07c *101/44*
U.S. Cl. 260—518          9 Claims

ABSTRACT OF THE DISCLOSURE

Production of alkali metal salts of phenylglycine by reaction of aniline with hydrocyanic acid and formaldehyde or of aniline with hydroxyacetonitrile followed by hydrolysis of the phenylglycine nitrile formed with an alkali metal hydroxide, the process being carried out continuously in a plurality of stages.

---

This invention relates to a new process for the production of alkali metal salts of phenylglycine.

It is known from British patent specification No. 2,733 that alkali metal salts of phenylglycine are obtained by reacting formaldehyde with aniline and an alkali metal cyanide in a single stage with the elimination of ammonia. However the yields according to this method are unsatisfactory.

It is known from German patent specification No. 151,538 that phenylglycine nitrile is obtained from aniline, formaldehyde and hydrocyanic acid, the reactants being used in stoichiometric amounts. The product is however not sufficiently pure for further processing and has to be recrystallized. An impure product which has to be recrystallized prior to hydrolysis is also obtained in the reaction of aniline with stoichiometric amounts of hydroxyacetonitrile described in German patent specification No. 138,098.

A process for the production of alkali metal salts of phenylglycine is described in BIOS Final Report No. 986, page 312, according to which two molecules of aniline and one molecule of formaldehyde are first condensed to form diphenamine; the latter is reacted in strongly diluted aqueous solution with an alkali metal cyanide and carbon dioxide to form sodium bicarbonate and phenylglycine nitrile which is hydrolyzed to the corresponding alkali metal salt of phenylglycine. In this method it is necessary to separate large amounts of dilute sodium bicarbonate solution. Since large reactors are required, the process is extremely expensive. Moreover it cannot be carried out continuously.

It is the object of this invention of provide a process for the production of alkali metal salts of phenylglycine in which high yields are obtained, in which very pure products having uniform quality are obtained, in which isolation and purification of the phenylglycine nitrile intermediately formed are unnecessary, in which sodium bicarbonate is not formed as a byproduct, in which substantially smaller reactors and substantially less control are required than in prior art processes.

This and other objects are achieved in a continuous process for the production of alkali metal salts of phenylglycine by reaction of aniline with hydrocyanic acid and formaldehyde, or of aniline with hydroxyacetonitrile in aqueous solution at elevated temperature followed by hydrolysis of the phenylglycine nitrile formed with an alkali metal hydroxide at elevated temperature, in which the reaction is carried out with a continuous supply of the reactants in a cascade arrangement consisting of at least two stages at a temperature between 80° and 130° C., in which aniline, hydrocyanic acid and formaldehyde, or aniline and hydroxyacetonitrile are supplied in at least one stage (condensation reaction), after-reaction is optionally allowed to take place in a following stage, at least part of the aqueous phase of the reaction mixture is optionally separated, alkali hydroxide is supplied in at least one further stage (hydrolysis reaction) and optionally further after-reaction is allowed to take place in a final stage.

The starting materials used for the condensation reaction are aniline and hydroxyacetonitrile or, instead of hydroxyacetonitrile, formaldehyde and hydrocyanic acid, from which hydroxyacetonitrile is formed in the reaction mixture. Formaldehyde is used in commercial purity as an aqueous solution which generally contains about 25 to 40% by weight. Formaldehyde and hydrocyanic acid are used in the approximately molar ratio 1:1, i.e. practically stoichiometrically. Aniline is used in at least a stoichiometric amount with reference to hydroxyacetonitrile (or formaldehyde and hydrocyanic acid) and it is advantageous to use an excess. Generally 1 to 2, advantageously 1.2 to 1.5, moles of aniline is used per mole of hydroxyacetonitrile (or formaldehyde and hydrocyanic acid).

Condensation is carried out in aqueous solution, the reaction mixture in general containing 40 to 80%, advantageously 50 to 70%, particularly 60 to 70%, by weight of water.

The alkali metal hydroxide used to hydrolyze the phenylglycine nitrile intermediately formed is usually potassium hydroxide or sodium hydroxide. If a mixture of potassium hydroxide and sodium hydroxide be used, naturally a mixture of the corresponding salts of phenylglycine is obtained. It is usual to use about 1 to 1.3 moles, preferably 1.1 to 1.2 moles, of alkali metal hydroxide per mole of phenylglycine nitrile.

The reaction is carried out at a temperature between 80° and 130° C., preferably between 90° and 110° C. The temperature in the individual stages may be identical or different.

The process is carried out continuously in a cascade arrangement consisting of at least two stages. Two to six, particularly three to five, stages are generally used. This means that the reaction mixture flows consecutively through a plurality of spatially separated reaction zones (stages), stirred containers preferably being used as the reaction zones.

At least one stage, generally one to three stages, are required for the condensation reaction. When this reaction takes place in only one stage, the total amount of the reactants (aniline, hydrocyanic acid and formaldehyde, or aniline and hydroxyacetonitrile) is metered continuously into the reaction mixture. Since the reaction of the reactants takes place rapidly, hydrocyanic acid and formaldehyde (or hydroxyacetonitrile) are in general present in the reaction mixture to the extent of less than 10%, frequently only 1 to 5%, in free form. When more than one stage is used for the condensation reaction, the continuously supplied amount of starting materials is distributed between these stages; it is advantageous to introduce the whole of the aniline into the first stage and to distribute only the hydrocyanic acid and formaldehyde (or the hydroxyacetonitrile) between the individual stages.

If desired the condensation reaction may be followed by an aftertreatment stage, the residence time in this stage being advantageously chosen so that less than 2%, preferably less than 1%, by weight of the hydroxyacetonitrile (or formaldehyde and hydrocyanic acid) supplied is present in free form.

When a separate stage for after-reaction is not provided, the residence time in the condensation stage is advantageously adjusted so that less than 2% by weight, preferably less than 1% by weight, of the hydroxyacetonitrile (or formaldehyde and hydrocyanic acid) supplied is present in free form in the reaction mixture prior to entry into the hydrolysis stage.

The reaction mixture, which now contains only minimal amounts of hydroxyacetonitrile (or formaldehyde and hydrocyanic acid), is passed together with the alkali metal hydroxide continuously into the hydrolysis stage, and the aqueous phase of the reaction mixture, in which unreacted hydroxyacetonitrile (or formaldehyde and hydrocyanic acid) accumulates is advantageously wholly or partly removed.

Hydrolysis is also preferably carried out in the presence of water, the hydrolysis mixture in general containing 40 to 80% by weight, particularly 50 to 60% by weight, of water. Hydrolysis may also take place in more than one stage, particularly 1 to 3 stages, the addition of alkali metal hydroxide being distributed between these stages.

The hydrolysis stage is advantageously followed by a further stage for after-reaction. The residence time in this stage (or in the hydrolysis stage when no after-reaction stage is used) is chosen so that the resultant reaction mixture contains less than 1% by weight, advantageously less than 0.1% by weight, of phenylglycine nitrile.

The reaction mixture is freed in the usual way from any excess of aniline used, for example by extracting it with a solvent for aniline, such as benzene or toluene, or by distilling off aniline as an azeotrope with water. The aniline may be removed during the hydrolysis or during the after-reaction, the final stage advantageously being carried out in a still. The aniline recovered may be returned without further purification to the condensation reaction.

The phenylglycine salt solution, free from aniline, may be converted in the usual way into an anhydrous form by evaporating the water.

Alkali metal salts of phenylglycine are valuable intermediates in the synthesis of indigo.

The invention is further illustrated by the following examples in which parts are by weight unless stated otherwise. Parts by weight bear the same relation to parts by volume as the kilogram to the liter.

EXAMPLE 1

A cascade of four stirred vessels is used, each having an effective capacity of 600 parts by volume. 140 parts of aniline and 190 parts of 30% aqueous hydroxyacetonitrile solution are continuously metered per hour into the first stirred vessel. 104 parts of a 50% by weight aqueous solution of potassium hydroxide and sodium hydroxide in the weight ratio 60:40 is continuously metered into the third stirred vessel. The molar ratio of aniline:hydroxyacetonitrile:alkali metal hydroxide is 1.5:1:1.1. The average residence time for each stirred vessel is about two hours. Formation of phenylglycine nitrile takes place at a reaction temperature of 100° C., hydroxyacetonitrile being reacted to the extent of about 90% in the first stirred vessel and up to 99% of the theory in the second stirred vessel. The alkaline hydrolysis of phenylglycine nitrile is also carried out at 100° C. and proceeds in the third stirred vessel to the extent of more than 90% of the theory. Hydrolysis is practically complete in the fourth stirred vessel. After the excess aniline has been extracted with benzene, the product is an about 50% phenylglycine salt solution from which on an average 191 parts of phenylglycine salt with a purity of about 94% by weight is recovered per hour. The yield of phenylglycine salt is 99% of the theory.

EXAMPLE 2

A cascade of three identical stirred vessels is used, each having an effective capacity of 600 parts by volume. These are indicated at A, B and C in the accompanying diagrammatic drawing. 93 parts of aniline per hour is supplied to the first stirred vessel A through line 1. 100 parts per hour of 27% aqueous hydrocyanic acid and 91 parts per hour of 33% aqueous formaldehyde solution are metered into the vessel A through line 2. The molar ratio of hydrocyanic acid to formaldehyde is stoichiometric. Caustic alkali solution (104 parts per hour of a 50% by weight aqueous caustic alkali solution containing potassium hydroxide and sodium hydroxide in the weight ratio 60:40) is supplied through line 3. The temperature in all stages is about 100° C. A distillation column having a still D, about six theoretical trays for the stripping section E and a short concentrating column F having about 1 theoretical tray, is connected to the third stirred vessel C. After the azeotrope has been separated into components in a separator G, 49.5 parts per hour of phase rich in aniline (containing about 94% of aniline) is discharged from the distillation column and returned direct to the first stirred vessel A of the cascade. At a condensation temperature of 90° C. at the top H of the column, the aniline distilled off contains less than 0.2% by weight of ammonia. At the same time about 10% of the whole of the ammonia from the reaction passes over as top product and is returned through line 4 into the third reaction vessel C. The ammonia leaving the vessel C through the reflux condenser I contains less than 0.01% by weight of aniline. An about 50% solution of phenylglycine salt practically free from aniline is discharged from the still D in which hydrolysis is completed at the boiling temperature and a mean residence time of about one hour. 191 parts of phenylglycine salt per hour is obtained with a purity of about 94%. The yield, based on the starting materials, is 99% of the theory.

We claim:

1. A process for the production of alkali metal salts of phenylglycine by the condensation reaction of aniline with a member selected from the group consisting of (a) hydrocyanic acid and formaldehyde and (b) hydroxyacetonitrile in aqueous solution at elevated temperature followed by hydrolysis of the phenylglycine nitrile formed in said condensation reaction with an alkali metal hydroxide at elevated temperature, which comprises carrying out the reactions with a continuous supply of the reactants and reaction products to and through two to six consecutively, spatially separated reaction zones at a temperature betwen 80° and 130° C. with said condensation reaction conducted in one to three of said zones and said hydrolysis conducted in one to three of said zones, and alkali metal hydroxide being supplied in one to three stages.

2. A process as claimed in claim 1 wherein said aniline and one of (a) and (b) are supplied in the first one to three of said zones, substantially completing said condensation reaction in the next zone by supplying thereto only the reaction product from said first one to three zones, supplying to the next following one to two of said zones with alkali metal hydroxide and the reaction product from said next zone to effect said hydrolysis, and substantially completing said hydrolysis in one to three last zones by supplying thereto only the reaction product from said immediately preceding zone.

3. A process as claimed in claim 1 wherein aniline and hydrocyanic acid and formaldehyde are supplied to at least the first reaction zone, and the molar ratio of aniline to formaldehyde to hydrocyanic acid fed to said zones for said condensation reaction is approximately 1–2:1:1, respectively.

4. A process as claimed in claim 3 wherein said condensation reaction is carried out in aqueous solution with the reaction mixture containing 40 to 80% by weight of water.

5. A process as claimed in claim 3, said alkali metal hydroxide is added in an amount of 1 to 1.3 mols per mol of said phenylglycine to effect said hydrolysis.

6. A process as claimed in claim 1 wherein the hydrocyanic acid and formaldehyde or hydroxyacetonitrile is present in the reaction mixture of said condensation reaction in free form in an amount never exceeding 10%.

7. A process as claimed in claim 6 wherein said condensation reaction is carried out in more than one of said zones, the whole of said aniline being fed to the first zone and the hydrocyanic acid and formaldehyde or hydroxyacetonitrile being fed to said first zone and at least one subsequent zone.

8. A process as claimed in claim 2 wherein the reaction mixture is held in said next zone for a residence time sufficient to provide a formaldehyde and hydrocyanic acid or hydroxyacetonitrile content in free form of less than 2%.

9. A process as claimed in claim 8 wherein the reaction mixture is maintained in said last zones for a residence time sufficient to provide a phenylglycine nitrile content of less than 1% by weight.

References Cited

UNITED STATES PATENTS 1,798,713    3/1931    Wait _____ 260—518

LORRAINE A. WEINBERGER, Primary Examiner

L. A. THAXTON, Assistant Examiner

U.S. Cl. X.R.

260—465

PO-1050
(5/69)

UNITED STATES PATENT OFFICE
CERTIFICATE OF CORRECTION

Patent No. 3,538,152      Dated November 3, 1970

Inventor(s) Hubert Kindler et al

It is certified that error appears in the above-identified patent and that said Letters Patent are hereby corrected as shown below:

Column 1, line 7, after "Germany" insert -- , assignors to Badische Anilin- & Soda-Fabrik Aktiengesellschaft, Ludwigshafen (Rhine), Germany --.

SIGNED AND
SEALED
MAR 9 1971

(SEAL)
Attest:

Edward M. Fletcher, Jr.
Attesting Officer

WILLIAM E. SCHUYLER,
Commissioner of Pate